United States Patent [19]

Kitazawa et al.

[11] 4,424,847
[45] Jan. 10, 1984

[54] SPACE SAVE SPARE TIRE

[75] Inventors: Yoichi Kitazawa, Higashiyamato; Naoki Yamazaki, Kodaira, both of Japan

[73] Assignee: Bridgestone Tire Company Limited, Tokyo, Japan

[21] Appl. No.: 385,963

[22] Filed: Jun. 7, 1982

[30] Foreign Application Priority Data

Oct. 15, 1979 [JP] Japan .................................. 54-141331

[51] Int. Cl.³ .......................... B60C 9/20; B60C 19/12
[52] U.S. Cl. ............................ 152/352 R; 152/354 R; 152/360; 152/361 R; 152/359; 57/250; 57/902
[58] Field of Search ............... 152/152, 352 R, 354 R, 152/354 RB, 355, 356, 360, 361, 359, DIG. 16; 57/250-251, 902

[56] References Cited

U.S. PATENT DOCUMENTS 3,225,812 12/1965 Barrett ............................. 152/361 R
3,703,203 11/1972 Simpson ............................ 152/354
3,838,725 10/1974 Lejeune ........................... 152/361 R
4,077,454 3/1978 Miyoshi et al. ..................... 152/354
4,235,274 11/1980 Suzuki et al. ............... 152/361 DM

OTHER PUBLICATIONS

Blow, C. M., *Rubber Technology and Manufacture*, (CRC Press 1971), p. 220, Section 6.7.2.

Primary Examiner—Lois E. Boland
Attorney, Agent, or Firm—Sughrue, Mion, Zinn, Macpeak and Seas

[57] ABSTRACT

A space saving spare tire usually stored in a vehicle and used in the case of emergency travel on road when a puncture failure or the like is induced in a tire mounted on the vehicle and run on road. The spare tire comprises an internal pressure penetration preventive cord layer superimposed about the crown portion of a toroidal carcass and a cushion rubber layer interposed between the internal pressure penetration preventive cord layer and the toroidal carcass and having a gauge which is at least equal to that of a coating rubber interposed between the carcass plies.

6 Claims, 1 Drawing Figure

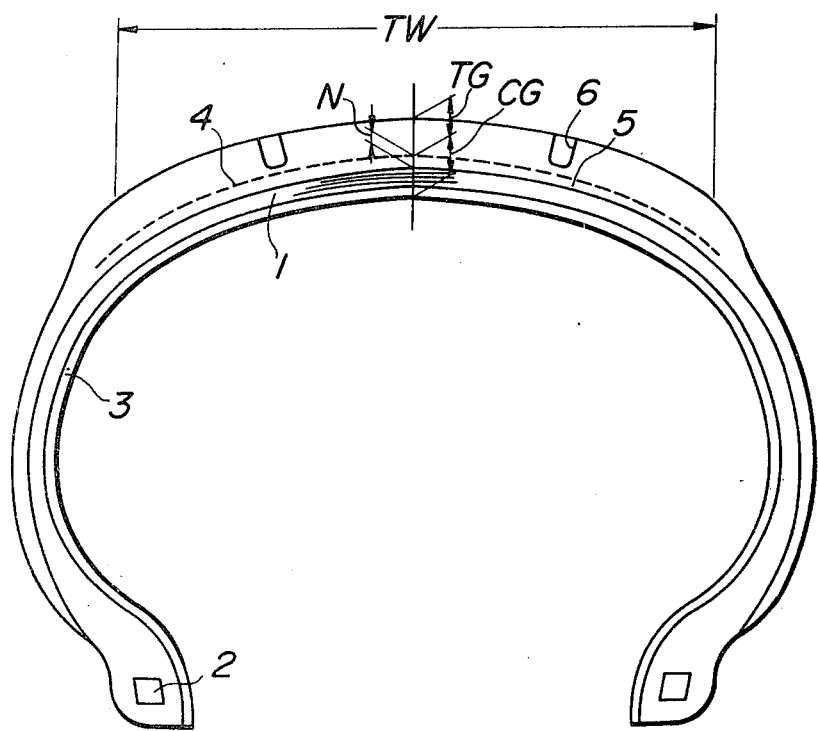

SPACE SAVE SPARE TIRE

This is a continuation, of application Ser. No. 193,695, filed Oct. 3, 1980 (now abandoned).

BACKGROUND OF THE INVENTION

1. Field of the Invention

This invention relates to a space saving spare tire which is ready for use in the case of emergency travel on road when a puncture failure or the like is induced in a tire mounted on a vehicle and run on road. The spare tire is normally stored in the vehicle and exclusively used as a spare tire.

2. Description of the Prior Art

In view of saving the space, the above mentioned kind of spare tire is generally classified into a first type spare tire which has an extremely small width and a second type spare tire which is folded and hence is extremely small in volume and appearance.

The first type spare tire which is extremely small widthwise generally has a width on the order of 50% to 80% if compared with a width of a usual tire (which will hereinafter be called as a control tire) and provides extra volume for storage. In addition, the first type spare tire is stored under an inflated condition by applying a high internal pressure on the order of 1.5 to 3.0 times higher than the internal pressure applied to the usual control tire for the purpose of obtaining the same load withstanding ability as that of the control tire. As a result, the first type spare tire has a shape and dimension similar in appearance to a tire for two-wheeled vehicles.

The second type spare tire which is smaller in appearance than the control tire has a volume which is 70% to 80% that of the control tire under its deflated condition and, is stored under this condition. As a result, the second type spare tire can considerably provide extra storage volume. But, when the second type spare tire is used, it must be inflated by means of an inflater to make the tread width, tire width and outer diameter thereof substantially the same as those of the control tire.

Both the first and second type spare tires have good and bad points of their own, but these tires are temporarily used only in the case of emergency. In these spare tires, the tread thickness thereof must be extremely smaller than that of the control tire for the purpose of maintaining cornering performance. In addition, the first type spare tire is used under inflated condition for a long time, so that the tire is subjected to the high internal pressure. As a result, if the first type spare tire is subjected to a cut when the tire is used, the cut easily reaches the carcass because the tread gauge is thin, thereby leaking air through the portion subjected to the cut failure. In general, the carcass cord has an air permeable property. As seen from the above, the first type spare tire has a vital drawback in that the internal pressure becomes decreased and hence the load withstand ability is degraded.

In addition, both the first and second type spare tires are used about one time a year and the internal pressure thereof is not checked. If the internal pressure is low when the spare tire is used, the load withstand ability thereof can not be obtained. As a result, the use of measures of preventing the first type spare tire from leaking air is important.

SUMMARY OF THE INVENTION

An object of the invention, therefore, is to provide a space saving spare tire which belongs to the above mentioned first type spare tire and which is simple in construction and can prevent air leakage even when a cut is induced in the tread.

A feature of the invention is the provision in a space saving spare tire comprising a pair of bead portions, and a toroidal carcass reinforcement extending across said bead portions and composed of a plurality of rubberized bias laid plies. The tire is substantially equal in outer diameter but extremely smaller in width when compared with tires usually used under condition mounted on vehicles and being usually stored in the vehicles under an inflated condition with an extremely high internal pressure applied therein. The tire has an internal presure penetration preventive cord layer superimposed about the crown portion of said toroidal carcass and a cushion rubber layer interposed between said internal pressure penetration preventive cord layer and said toroidal carcass and having a gauge which is at least equal to that of a coating rubber interposed between the carcass plies.

Further objects and features of the invention will be fully understood from the following detailed description with reference to the accompanying drawing, wherein:

BRIEF DESCRIPTION OF THE DRAWING

A single FIGURE is a cross-sectional view of an embodiment of a space saving spare tire according to the invention.

DETAILED DESCRIPTION OF THE PREFERRED EMBODIMENT

Investigations and experimental tests have demonstrated the result that the use of the internal pressure penetration preventive cord layer superimposed about the crown portion of the toroidal carcass prevents a cut induced in the tread from reaching into the carcass to suppress leakage of air unavoidably occurring due to the cut.

The cords of the carcass plies may be inclined at 20° to 50° to the circumferential direction of the tire and crossed with the cords of adjacent carcass ply.

The internal pressure penetration preventive cord layer may be composed of cords formed of conventional textile cord materials, preferably, nylon, polyester, rayon or the like. In accordance with this invention the cord consists of a bundle of 2 to 20 filaments with or without twisting.

FIG. 1 shows one embodiment of a space save spare tire according to the invention. The tire shown in the drawing has a size of T135/70D/5 (a first type spare tire for passenger cars). In the drawing, TW shows a tread width which is 60% to 80% of that of a control tire. A toroidal carcass 1 is composed of 4 textile cord layers each having bias ply cords formed of nylon, rayon, polyester or the like and inclined at an angle between 20° and 50°, preferably 25° and 35° to the circumferential direction of the tire. Each end of the carcass 1 is wound around a bead wire 2 from the inside toward the outside thereof in the conventional manner. In the drawing, reference numeral 3 designates an air impermeable inner liner layer which is indispensable to a tubeless tire and 4 an internal pressure penetration preventive cord layer according to the invention.

The cords of the internal pressure penetration preventive cord layer 4 are inclined at an angle to the circumferential direction which is substantially the same as that of the cords of the toroidal carcass 1. The inclined angle of the cords of the internal pressure penetration preventive cord layer 4 is not so important. The internal pressure penetration preventive cord layer 4 is superimposed through a cushion rubber layer 5 about the crown portion of the toroidal carcass 1. The cushion rubber layer 5 has a gauge N which is at least equal to the gauge of a coating rubber interposed betwen the plies of the toroidal carcass 1.

The gauge N of the cushion rubber 5 is uniform in thickness or may be uneven in thickness and the maximum thickness portion whose thickness is 2 to 10 times larger than that of the coating rubber interposed between the plies of the toroidal carcass 1 and located at that position which is not opposed to a tread groove 6. As a result, the inner pressure penetration preventive layer 4 may be made wavy in shape and embedded in the cushion rubber 5.

The cords of the inner pressure penetration preventive cord layer 4 may preferably be composed of a bundle of at most 20 monofilaments preferably 2 to 20 filaments with or without twisting.

The inner pressure penetration preventive cord layer 4 arranged at the crown region only can attain its object of providing the tread cut preventive property of the tire. But, similar to the toroidal carcass, the inner pressure penetration preventive cord layer 4 may be extended to the bead wire 2.

It is preferable to make the diameter $\phi$ of the filament of the cord of the inner pressure penetration preventive cord layer 4, 0.01 mm to 0.5 mm, by taking the workability or the like thereof into consideration.

In the present invention, the cords of the inner pressure penetration preventive cord layer 4 function to prevent a tread cut from reaching the layer 4. In addition, even when the unavoidable cut reaches the layer 4, the air impermeable property of the cords of the layer 4 functions to sufficiently prevent the air leakage. Similar to the first type spare tire, in the above mentioned kind of rubber, the tread rubber has a relatively thin thickness TG which is substantially the same as a thickness CG of the carcass inclusive of the inner liner 3.

The invention will now be described with reference to a practical example.

Provision was made of a test spare tire composed of the above mentioned first type spare tire having a size of T135/70D/5 and adapted to be used as an emergency spare tire for control tire having a size of 185SR14. The test tire had a tread width TW which is 73% of that of the control tire, an outer diameter which is 87% of that of the control tire and an air volume which is 54% of that of the control tire.

In general, such kind of the first type spare tire has a tread width TW which is 50% to 80% if compared with that of the control tire and an air volume which is 45% to 75% if compared with that of the control tire.

The above mentioned test tire comprised a toroidal carcass 1 composed of 4 rubberized plies including nylon cords of 840 d/2, the cord of the adjacent rubberized plies being inclined at an angle of 30° to the circumferential direction of the tire and crossed with each other, a cushion rubber 5 having a rubber gauge N which is two times larger than a gauge of a coating rubber of the toroidal carcass and superimposed about the toroidal carcass 1, and a cord layer 4 having cords composed of a bundle of 14 filaments each filament having a diameter $\phi$ of 0.15 mm and twisted 16 times per 10 cm and superimposed about the crown portion of the cushion rubber 5, the cords being crossed with the cords of the outermost layer of the toroidal carcass.

The relation between the tread thickness TG and the toroidal carcass thickness CG was 1:1.

Provision was also made of a comparative spare tire which was the same in size as the test spare tire, but was not provided with the inner pressure penetration preventive cord layer 4 according to the invention.

The above mentioned test spare tire and comparative spare tire were subjected to a running test over a distance of 5,000 km under such condition that the tires are susceptible to cut and the amount of air penetrated through the test spare tire was compared with that of the comparative spare tire. Let the air holding ratio of the test spare tire according to the invention be 100, then the air holding ratio of the comparative spare tire was 70. That is, even though the comparative spare tire comprised the inner liner 3 formed of an air impermeable rubber, the air impermeable rubber was not complete enough in ability of holding the tire internal pressure. As a result, the air absorbed into the toroidal carcass 1 leaked out of the tire through the tread cut.

As stated hereinbefore, the space saving spare tire according to the invention is capable of eliminating the drawbacks which have been encountered with the first type spare tire and which have reduced the load withstand ability due to the air leakage.

Particularly, the first type spare tires can be stored for a long time of longer than one year without checking the air leakage and then suddenly be used. As a result, one of the important abilities required for the first type spare tire consists in an ability that can hold the tire internal pressure up to the time at which the spare tire is suddenly used. The space save spare tire according to the invention can satisfy the above mentioned requirements necessary for the first type spare tire.

What is claimed is:

1. A space saving spare tire comprising; a pair of bead portions, a toroidal carcass reinforcement extending across said bead portions and composed of a plurality of rubberized bias laid plies comprising textile cords inclined at an angle between 20° and 50° to the circumferential direction of the tire and crossed between adjacent plies, a tread disposed about the crown portion of said carcass, and an air impermeable inner liner layer laminated to the inner surface of said carcass, said tread having a relatively thin thickness which is substantially the same as a thickness of said carcass inclusive of said inner liner layer, and said spare tire being substantially equal in outer diameter but smaller in width compared with tires normally used on vehicles and said spare tire being usually stored in the vehicles under an inflated condition with an extremely high internal pressure applied therein, an internal pressure penetration preventive cord layer and a cushion rubber layer, said cushion rubber layer having a gauge which is at least equal to that of a coating rubber interposed between the carcass plies, said internal pressure penetration preventive cord layer composed of conventional textile cord material such as nylon, polyester or rayon each cord of which consists of a bundle of 2 to 20 filaments, each filament having a diameter in the range of 0.01 mm to 0.5 mm, said internal pressure penetration preventive cord layer and said cushion rubber layer being interposed between said carcass and said tread and said cushion rubber layer interposed between said internal presure penetration preventive cord layer and said carcass.

2. The tire according to claim 1, wherein said gauge of said cushion rubber layer is 2 to 10 times larger than that of the coating rubber interposed between the carcass plies.

3. The tire according to claim 1, wherein said cushion rubber is uniform in thickness.

4. The tire according to claim 1, wherein said cushion rubber is uneven in thickness and the maximum portion whose thickness is 2 to 10 times larger than that of the coating rubber interposed between the toroidal carcass plies is located at that position which is not opposed to a tread groove.

5. The tire according to claim 1, wherein said inner pressure penetration preventive layer is wavy in shape and embedded in said cushion rubber.

6. The tire of claim 3, wherein said cushion rubber is of uniform thickness 2 to 10 times larger than that of said coating rubber interposed between the plies of said carcass.

* * * * *

UNITED STATES PATENT AND TRADEMARK OFFICE
CERTIFICATE OF CORRECTION

PATENT NO. : 4,424,847
DATED : January 10, 1984
INVENTOR(S) : Kitazawa et al

It is certified that error appears in the above-identified patent and that said Letters Patent is hereby corrected as shown below:

On the cover page, the Foreign Application Priority Data should read:

Oct. 15, 1979 [JP] Japan 54-141331 [U]

Signed and Sealed this

Twenty-third Day of October 1984

[SEAL]

Attest:

GERALD J. MOSSINGHOFF

Attesting Officer

Commissioner of Patents and Trademarks